(12) United States Patent
Kluge et al.

(10) Patent No.: US 9,033,838 B2
(45) Date of Patent: May 19, 2015

(54) DRIVE UNIT HAVING A TRANSMISSION

(75) Inventors: Marc Kluge, Besigheim (DE); Jörg Aniol, Leonberg (DE); Arnd Langer, Cleebronn (DE); Dragan Dobric, Stuttgart (DE); Achim Gordner, Grossberghofen (DE); August Schäffler, Allershausen (DE); Kerstin Haubner, Königs Wusterhausen (DE)

(73) Assignee: Dr. Ing. h.c. F. Porsche Aktiengesellschaft, Stuttgart (DE)

(*) Notice: Subject to any disclaimer, the term of this patent is extended or adjusted under 35 U.S.C. 154(b) by 221 days.

(21) Appl. No.: 13/609,939

(22) Filed: Sep. 11, 2012

(65) Prior Publication Data

US 2013/0065721 A1    Mar. 14, 2013

(30) Foreign Application Priority Data

Sep. 12, 2011  (DE) .................. 10 2011 053 495

(51) Int. Cl.
| | |
|---|---|
| F16H 48/06 | (2006.01) |
| F16H 7/16 | (2006.01) |
| F16H 57/035 | (2012.01) |
| F16H 1/22 | (2006.01) |
| F16H 1/28 | (2006.01) |
| F16H 57/00 | (2012.01) |

(52) U.S. Cl.
CPC *F16H 7/16* (2013.01); *F16H 1/227* (2013.01); *F16H 1/28* (2013.01); *F16H 57/035* (2013.01); *F16H 2057/005* (2013.01)

(58) Field of Classification Search
CPC ................... F16H 1/227; F16H 1/28
USPC ................... 475/149; 180/65.51, 65.6
See application file for complete search history.

(56) References Cited

U.S. PATENT DOCUMENTS

| | | | | |
|---|---|---|---|---|
| 3,628,387 | A | | 12/1971 | Gaskell et al. |
| 4,896,740 | A | * | 1/1990 | Hueckler et al. ............... 74/390 |
| 5,561,924 | A | * | 10/1996 | Ramey .................. 280/6.154 |
| 7,537,071 | B2 | * | 5/2009 | Kamiya .................. 180/65.51 |
| 2005/0211481 | A1 | * | 9/2005 | Sasamoto ................. 180/65.2 |

FOREIGN PATENT DOCUMENTS

| | | |
|---|---|---|
| DE | 929228 | 6/1955 |
| DE | 2008706 A | 10/1970 |
| DE | 19751371 A1 | 12/1998 |
| EP | 1574379 B1 | 9/2005 |

OTHER PUBLICATIONS

Search Report from priority application DE 10 2011 053 495.4, dated May 29, 2012, with partial English translation.

* cited by examiner

*Primary Examiner* — Derek D Knight
(74) *Attorney, Agent, or Firm* — RatnerPrestia

(57) ABSTRACT

A drive unit having a transmission, which has an input axis and an output axis, which are arranged parallel to one another and spaced apart. In a drive unit of this kind, provision is made for the transmission to be designed as a cartridge which forms a unit and is connected to a support element forming a component part of the drive unit. A drive unit embodied in this way allows quick and easy mounting of the transmission while allowing for the required transmission forces and transmission torques of the transmission. Moreover, the transmission can be embodied in a space-saving way.

10 Claims, 13 Drawing Sheets

DRIVE UNIT HAVING A TRANSMISSION

CROSS-REFERENCE TO RELATED APPLICATION

This U.S. patent application claims priority to German Patent application DE 10 2011 053 495.4, filed Sep. 12, 2011, which is incorporated by reference herein in its entirety.

FIELD OF THE INVENTION

The invention relates to a drive unit having a transmission, which has an input axis and an output axis, which are arranged parallel to one another and spaced apart.

BACKGROUND OF THE INVENTION

In drive units, ever higher transmission forces are required in the transmissions that are used. This is the case, for example, when the transmission interacts with an electric machine, whether this is an electric motor or an electric generator.

The electric motor serves to drive the transmission; by means of the transmission, the electric generator is driven to generate power.

In addition, there is a requirement in the case of drive units that the individual components of the drive unit should be quick and easy to assemble. Moreover, it is advantageous if the individual component of the drive unit, in particular the transmission, can not only cope with high transmission forces but is of space-saving configuration as well.

SUMMARY OF THE INVENTION in the case of a drive unit, it would be desirable to allow quick and easy mounting of the transmission, with the additional intention of achieving a space-saving transmission design that allows for the transmission forces and transmission torques required.

The invention proposes a drive unit of the type stated at the outset in which the transmission is designed as a cartridge which forms a unit and is connected to a support element forming a component part of the drive unit. Consequently, the transmission can be assembled completely from the individual parts thereof and all that is then required is to connect the cartridge thus formed to the support element. This reduces the outlay on production and assembly of the drive unit considerably.

The design of the transmission is particularly advantageous in terms of construction if it has two housing parts, which are designed as a pot and a cover, wherein the pot can be closed by means of the cover.

To enable the two housing parts to be connected securely, provision is made to screw them to one another.

The cartridge is preferably mounted in the support element in a manner which allows rotation in order to permit a parallel change in the support of one of the axes of the transmission relative to the support element. This makes it possible to adjust or align said axis relative to drive unit components interacting with the transmission.

In particular, the transmission is connected in a torque-transmitting manner to an electric machine, which is designed as an electric motor and/or as a generator. It is thus possible for an electric motor to drive the transmission directly or indirectly and for a component connected to an output of the transmission to be driven via the transmission. On the other hand, it is possible to drive the generator by means of the transmission. The component drives the transmission via the input of the latter, and the transmission drives the generator. The transmission can interact with an electric machine which combines the function of the electric motor and that of the electric generator.

One preferred area of application of the present invention relates to the embodiment of a motorcycle provided with an electric machine. On this motorcycle, provision is made for the support element to be a swingarm, which, in the region of one end, has a socket to allow pivotable support in a frame of the motorcycle. In the region of the other end, the swingarm has a socket for the cartridge. In the region of pivotable support, the electric machine is connected to the support element. A power transmission means is provided for transmitting torque between the electric machine and a shaft of the transmission.

The power transmission means is, in particular, a toothed belt or a toothed chain, for the purpose of engagement in a wheel designed as a gearwheel which is connected to the electric machine and a wheel designed as a gearwheel which is connected to the transmission. The possibility of supporting the cartridge in the support element in a manner which allows rotation in order to permit a parallel change in the support of one of the axes relative to the support element makes it possible, in the case of a change in the position of the axis associated with said wheel of the transmission, to adjust the position of said wheel and of the wheel connected to the electric machine relative to one another, thus enabling the toothed belt or toothed chain to be tensioned to a greater or lesser extent by turning the cartridge in the support element.

With respect to the possibility of turning the cartridge relative to the support element, it is regarded as particularly advantageous if the cartridge is connected to the support element by means of screws, with the screws passing through slotted holes in the support element. When the screws are loosened, the design of the slotted holes means that the cartridge can be turned relative to the support element and the secure connection between the cartridge and the support element in the desired relative position of the cartridge and the support element can be brought about by tightening the screws.

The turning of the cartridge relative to the support element is made possible, in particular, by the fact that the cartridge or a bridge element connected to the cartridge has a socket for a tool for turning the cartridge relative to the support element. This tool engages on the cartridge or the bridge element, in particular at a distance from the axis of rotation of the cartridge in the support element.

In order, in particular, to allow fine adjustment of the cartridge in terms of the rotational position relative to the support element, it is envisaged that an adjustable tensioning device be supported in the support element, having an adjusting element for the tensioning device, which interacts with the cartridge for fine adjustment of the rotational position of the cartridge and the support element. The adjusting element is, in particular, an adjusting screw. After adjustment of the relative position of the cartridge and the support element, the screws, which pass through the slotted holes in the cartridge, are tightened and thus bring about the secure connection between the cartridge and the support element.

In the transmission, one, first axis is an input axis and the other, second axis is an output axis, for example. In this case, the first axis can be driven by means of an electric motor. The second axis can be used, in particular, to drive a wheel, preferably a wheel of a vehicle, in particular a rear wheel of a motorcycle.

On the other hand, the second axis can be an input axis and the first axis can be an output axis. In this case, the second axis can be driven by means of a wheel, preferably a wheel of a vehicle, in particular a rear wheel of a motorcycle or by means of a wind wheel. The electric generator can be driven by means of the second axis of the transmission.

If the installation space available is of relatively small dimensions, it is as a rule impossible for transmissions with spur gear stages or planetary transmissions with a simple internal gear stage to cope with the required transmission forces. In the case of a spur gear transmission, for example, the center-to-center distance is too small for the forces required. In the case of an internal gear mechanism, the loads on the teeth for the required forces are too high.

Given this background situation, it is advantageous to embody the transmission as a planetary transmission. Using the terminology employed above, said planetary transmission has a sun wheel that can be rotated about a first axis, an internal wheel that can be rotated about a second axis and at least two planet wheels in engagement with the sun wheel and the internal wheel. In this planetary transmission, the two axes are arranged parallel to one another and spaced apart.

In this arrangement, the planetary transmission preferably has two or three planet wheels. If two planet wheels are used, they have, in particular, the same diameter. If three planet wheels are used, two of these have the same diameter, while the third wheel has a different diameter, in particular a larger diameter, than the two other planet wheels. In either case, the axes of the sun wheel and the internal wheel are arranged parallel to one another and spaced apart.

The planetary transmission is embodied in a particularly advantageous way in terms of construction if it has a first housing part and a second housing part, with the sun wheel and the planet wheels being mounted in the first housing part and the internal wheel being mounted in the second housing part.

When the housing parts of the planetary transmission are designed in the manner of the pot and cover described above, the cover, in particular, serves to accommodate the sun wheel and the planet wheels, while the pot serves to accommodate the internal wheel.

The support for the sun wheel and planet wheels is simple in terms of design if they are supported in a common bearing component mounted in the first housing part. The sun wheel and the planet wheels are thus supported directly in the first housing part or cover.

In the sense described above, the planetary transmission is designed as a cartridge which forms a unit and is connected to the support element, which forms a component part of the drive unit.

The cartridge is preferably mounted rotatably in the support element to allow a parallel change in the support of one of the axes of the planetary transmission relative to the support element.

In the context of the variants described above, the sun wheel can preferably be driven by means of an electric motor. By means of the internal wheel, it is possible, in particular, to drive the wheel, preferably the wheel of the vehicle, in particular the rear wheel of the motorcycle. If the second axis is the input axis and the first axis is the output axis, the internal wheel can be driven by means of the wheel, preferably the wheel of the vehicle, in particular the rear wheel of the motorcycle or by means of the wind wheel. The electric generator can then preferably be driven by means of the sun wheel.

BRIEF DESCRIPTION OF THE DRAWINGS

Further features of the invention will emerge from the claims, the attached drawing and the description of the preferred illustrative embodiment represented in the drawing, without being limited thereto.

In the drawing.

DETAILED DESCRIPTION OF THE DRAWINGS

Figure 1:
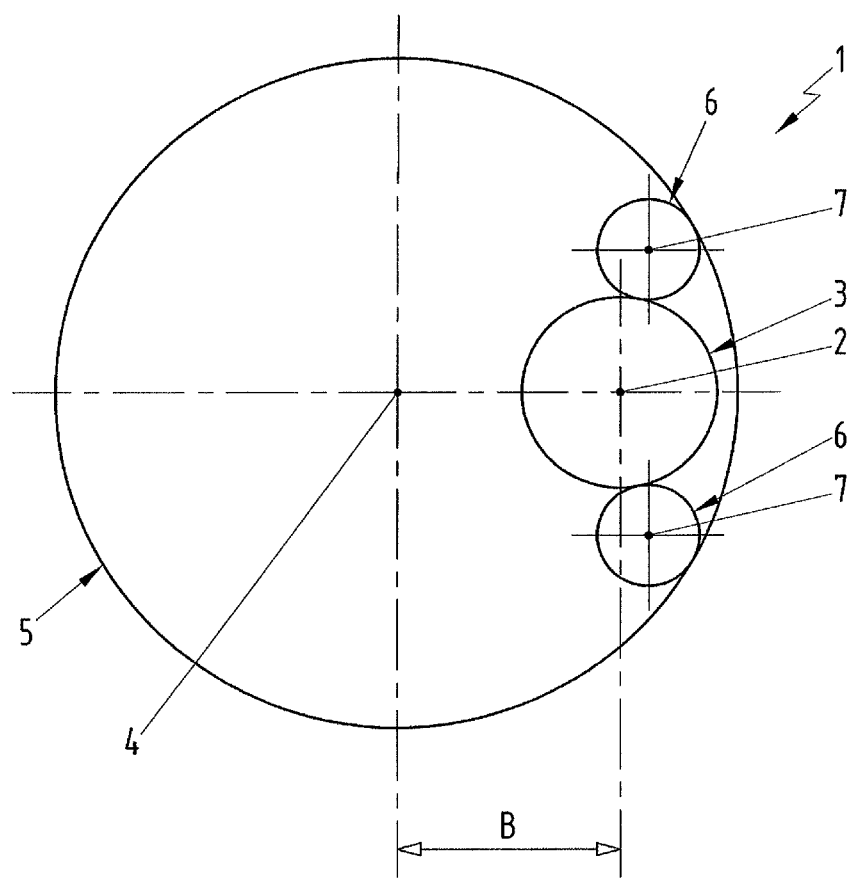
FIG. 1 shows a diagrammatic representation of a first embodiment of a planetary transmission used in the drive unit.

In the drive unit, which is described in greater detail below, a planetary transmission 1 is employed, as illustrated in principle in FIG. 1. This transmission has a sun wheel 3, which can be rotated about a first axis 2, and an internal wheel 5, which can be rotated about a second axis 4. The planetary transmission furthermore has two planet wheels 6, which are in engagement with the sun wheel 3 and the internal wheel 5. Axes 2 and 4 of the planetary transmission 1, which extend perpendicularly to the plane of the paper in FIG. 1, are arranged parallel to one another and spaced apart. This center-to-center distance is illustrated in FIG. 1 by the spacing dimension B. This spacing dimension is a predetermined center-to-center distance. Within the scope of this predetermined center-to-center distance, the aim is to ensure loads on the teeth in the planetary transmission 1 which are acceptable for high required forces in order to allow better utilization of the installation space. It is assumed here that the first axis 2 is assigned to the input and the second axis 4 is assigned to the output in normal operation of the planetary transmission 1, this being understood to mean operation in motor mode. It is quite possible for the planetary transmission 1 to be operated in the opposite direction in conjunction with a generator. In this case, forces are introduced via axis 4 and output via axis 2. For the sake of simplicity in the designation of the component parts of the planetary transmission and of the drive unit, which will be described in greater detail below, the first axis 2 is assumed to be the input axis and the second axis 4 is assumed to be the output axis.

In the planetary transmission 1, the power is transmitted from an input shaft, via the sun wheel 3, to the two planet wheels 6 and, from the latter, to the internal wheel 5 with the output of the latter. The fact that the output stage is an internal wheel means that only a small amount of space is required.

The axes of the planet wheels 6 are denoted by reference numeral 7.

Figure 2:
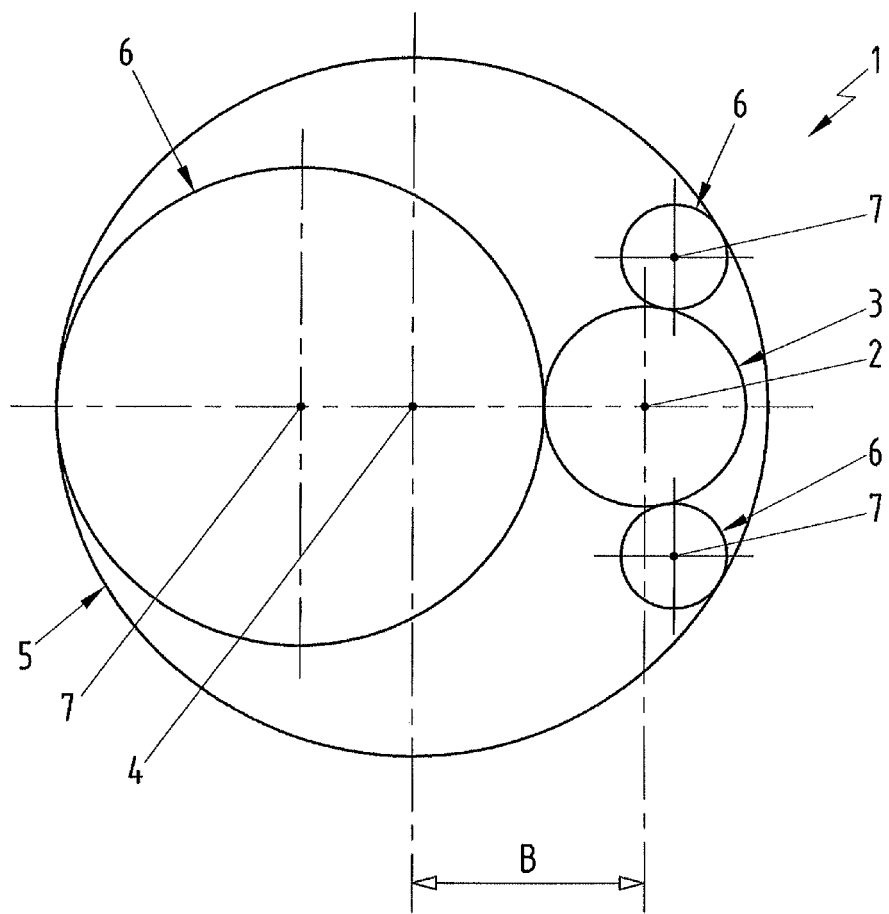
FIG. 2 shows a diagrammatic representation of a modified embodiment of a planetary transmission used in the drive unit.

The embodiment of the planetary transmission 1 according to FIG. 2 differs from the embodiment according to FIG. 1 only in that a third planet wheel 6 rotatable about an axis 7 is provided, said planet wheel meshing with the sun wheel 3 and the internal wheel 5. This internal wheel is arranged on the opposite side of internal wheel 5 from the two planet wheels 6, which are of equal diameter, and has a significantly larger diameter than the sun wheel 3 and the two planet wheels 6 of equal size.

In this embodiment, the torque introduced into the planetary transmission 1 is not introduced into the internal wheel 5 by the sun wheel 3 via two planet wheels 6 but via three planet wheels 6.

In this embodiment, the same predetermined center-to-center distance B can be implemented as in the embodiment according to FIG. 1.

Figure 3:
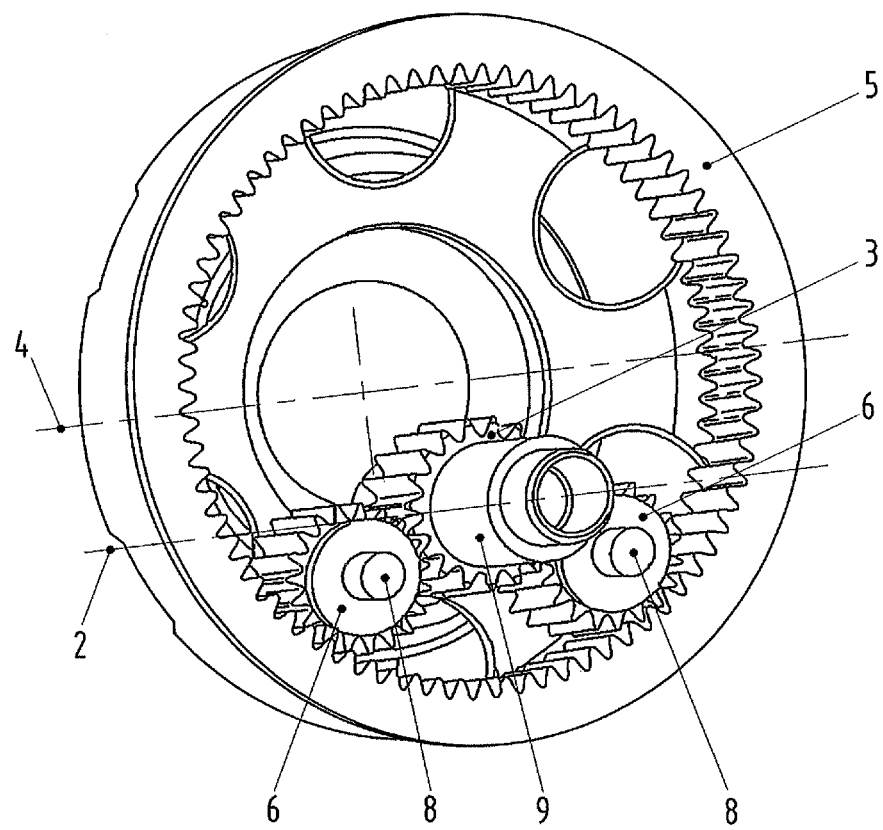
FIG. 3 shows a three-dimensional representation of those components of the planetary transmission according to the embodiment in FIG. 1 which have the gearwheels.

FIG. 3 illustrates the elements of the embodiment according to FIG. 1 in design details; the reference numerals used here correspond to those in FIG. 1. The bearing shafts 8 for the two planet wheels 6 and the shaft 9 connected for conjoint rotation to the sun wheel 3 are additionally illustrated.

Figure 4:
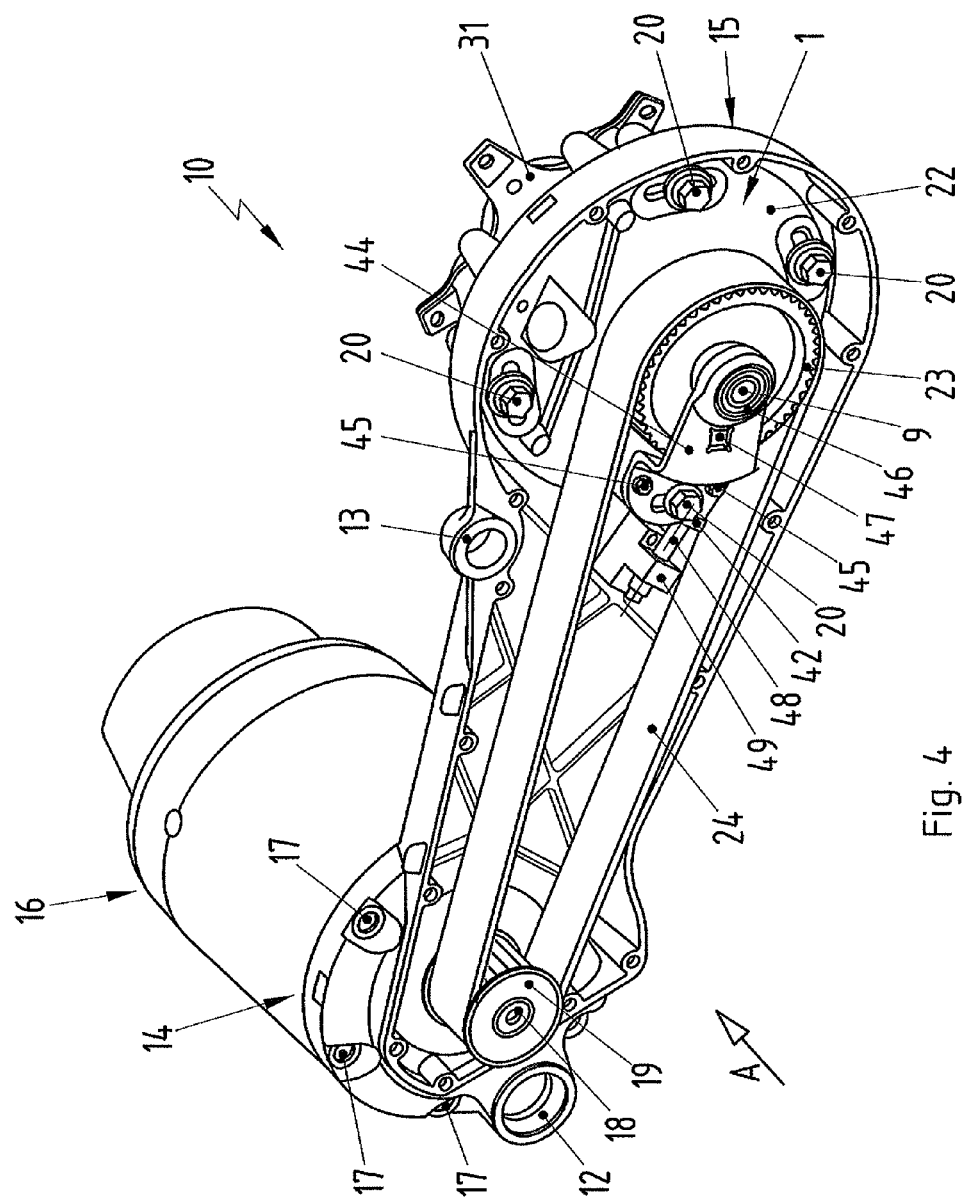
FIG. 4 shows a three-dimensional representation of the drive unit having the planetary transmission, said drive unit being used in conjunction with a rear wheel swingarm of a motorcycle.
Figure 5:
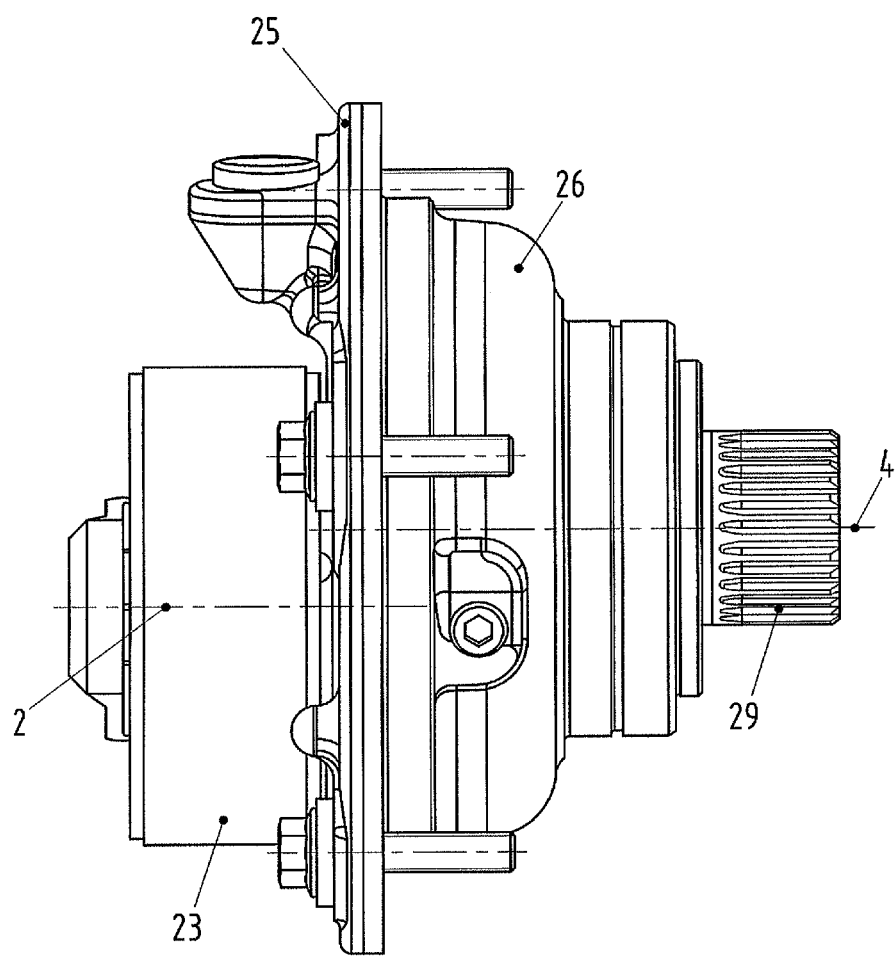
FIG. 5 shows a side view of the planetary transmission used in the drive unit according to FIG. 4, said transmission being designed as a cartridge, having an input wheel associated with the sun wheel of the transmission.

FIG. 4 illustrates the drive unit, which is denoted by reference numeral 10 and is used in conjunction with a rear axle of a motorcycle. The drive unit 10 has a support element 11, which is designed as a swingarm. This is a casting. In the region of one end, the swingarm 11 has a mounting socket 12 for the frame-mounted axle of the motorcycle, thus enabling the swingarm 11 to swing about this axle. At a distance from the mounting socket 12, the swingarm 11 has a further mounting socket 13 on the upper side thereof. It serves to accommodate a spindle, which is connected to a spring element, with the result that, when the swingarm 11 moves counterclockwise about the mounting socket 12, based on the orientation according to FIG. 4, it is moved counter to the force of the spring.

Figure 12:
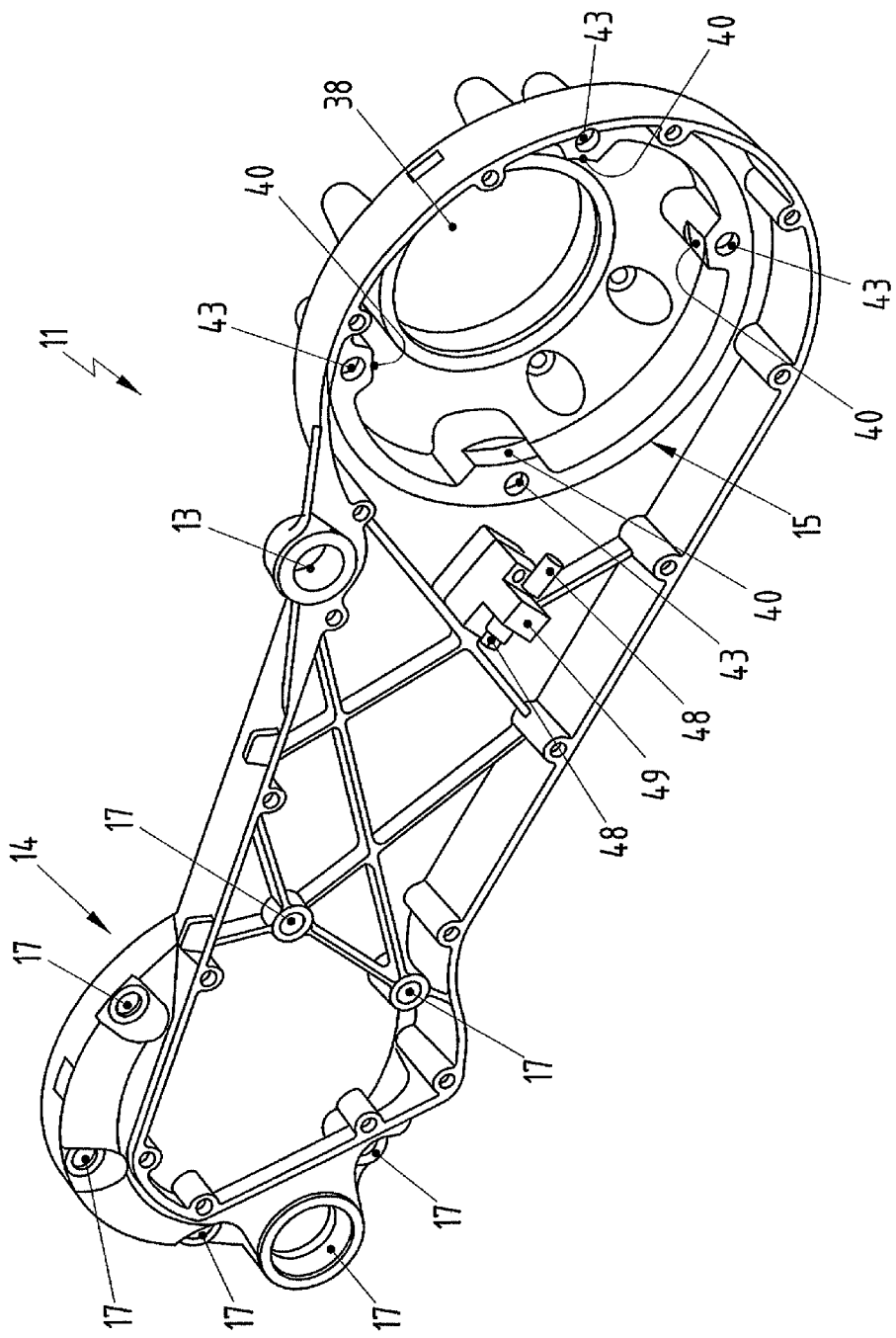
FIG. 12 shows a three-dimensional view of a support component forming a component part of the drive unit, which is designed as a swingarm.
Figure 13:
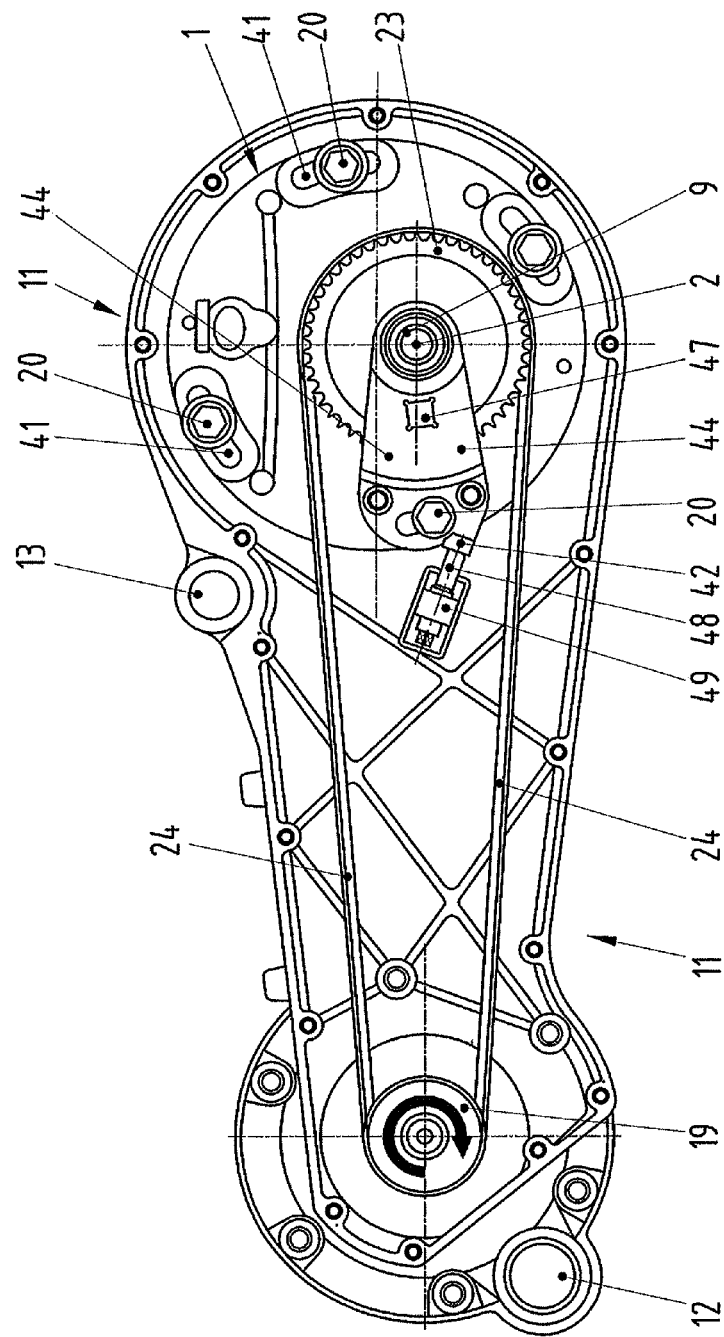
FIG. 13 shows a view of the drive unit in accordance with arrow A in FIG. 4.

As can additionally be seen in FIG. 12, the swingarm 11 is provided, in a location adjacent to mounting socket 12, with a mounting socket 14 on one side of the swingarm 11 and, in the region of the end remote from mounting socket 12, is provided with a mounting socket 15 on the other side of the swingarm 11. As can be seen from the illustration in FIG. 14, mounting socket 14 serves to accommodate an electric machine 16, which can be operated as an electric motor in the case where power is output and is an electric generator in the case where power is consumed.

The mounting socket 14 is provided with various holes 17 to receive screws (not shown), which are used to connect the swingarm 11 and the electric machine 16. A pinion 19 is mounted for conjoint rotation in an output shaft 18 of the electric machine 16. The pinion 19 is thus arranged on the side of the swingarm 11 which faces away from the side on which the electric machine 16 is mounted in the swingarm 11.

Mounting socket 15 serves to accommodate the planetary transmission 1. The planetary transmission 1 is designed as a cartridge that forms a unit and, accordingly, is also denoted by reference numeral 1 below. The preassembled planetary transmission or preassembled cartridge 1 is inserted into mounting socket 15 and is screwed to the swingarm 11 in this region by means of screws 20. The shaft 9 of the sun wheel 3 is passed out of the housing 22 of the planetary transmission 1 and carries an input wheel 23 for conjoint rotation at that point. This wheel and the pinion 19 are designed as gearwheels, around which a toothed belt 24 is wrapped. It would be no problem to provide a toothed chain instead, said chain interacting with the pinion 19 and the input wheel 23.

The detailed construction of the planetary transmission 1 or cartridge and of the component parts directly interacting with the planetary transmission 1 is described below with reference to the illustration in FIGS. 5 to 11.

Thus, the planetary transmission or cartridge has a first housing part, which is designed as a cover 25, and a second housing part, which is designed as a pot 26.

The sun wheel 3 and the planet wheels 6 are mounted in the cover 25, and the internal wheel 5 is mounted in the pot 26. The cover 25 and the pot 26 are screwed to one another. Threaded holes 27 in the cover 25 and holes 28 in the pot 26 corresponding to said holes 27 are illustrated. The cover 25 and the pot 26 are connected by means of screws (not shown specifically), which pass through the holes 28 and are screwed into the threaded holes 27.

Figure 6:
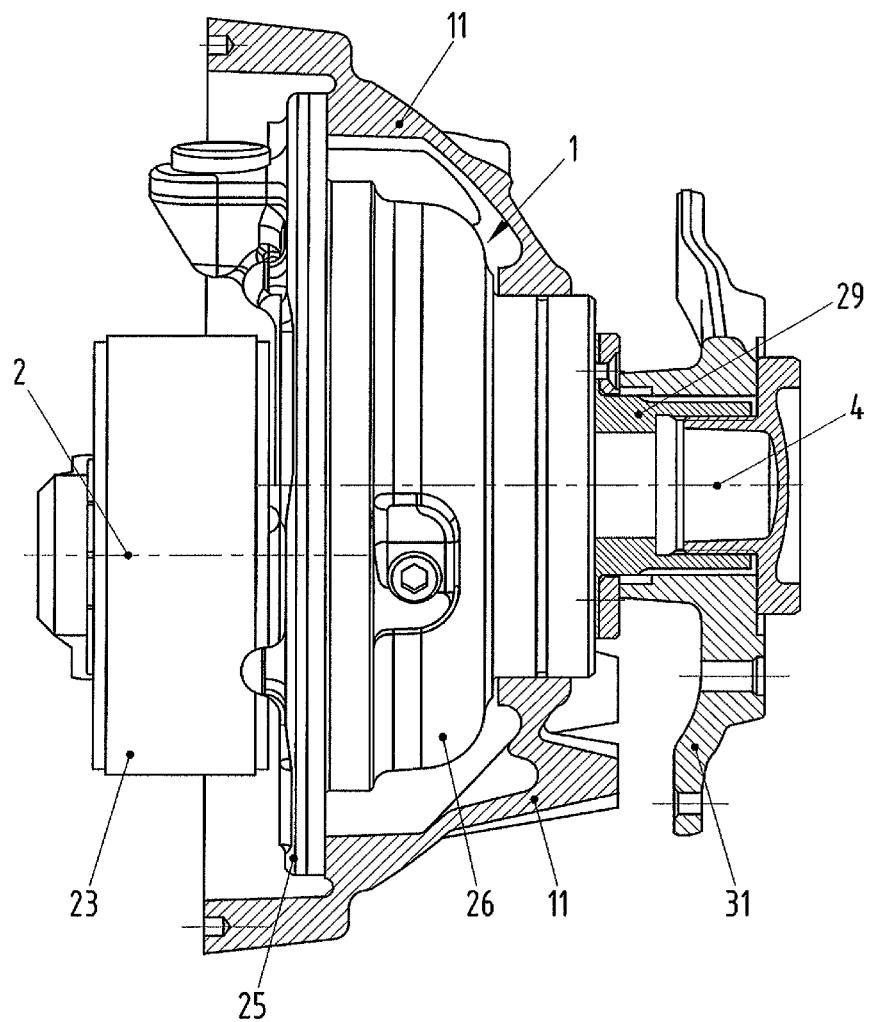
FIG. 6 shows a section through the arrangement according to FIG. 5.
Figure 7:
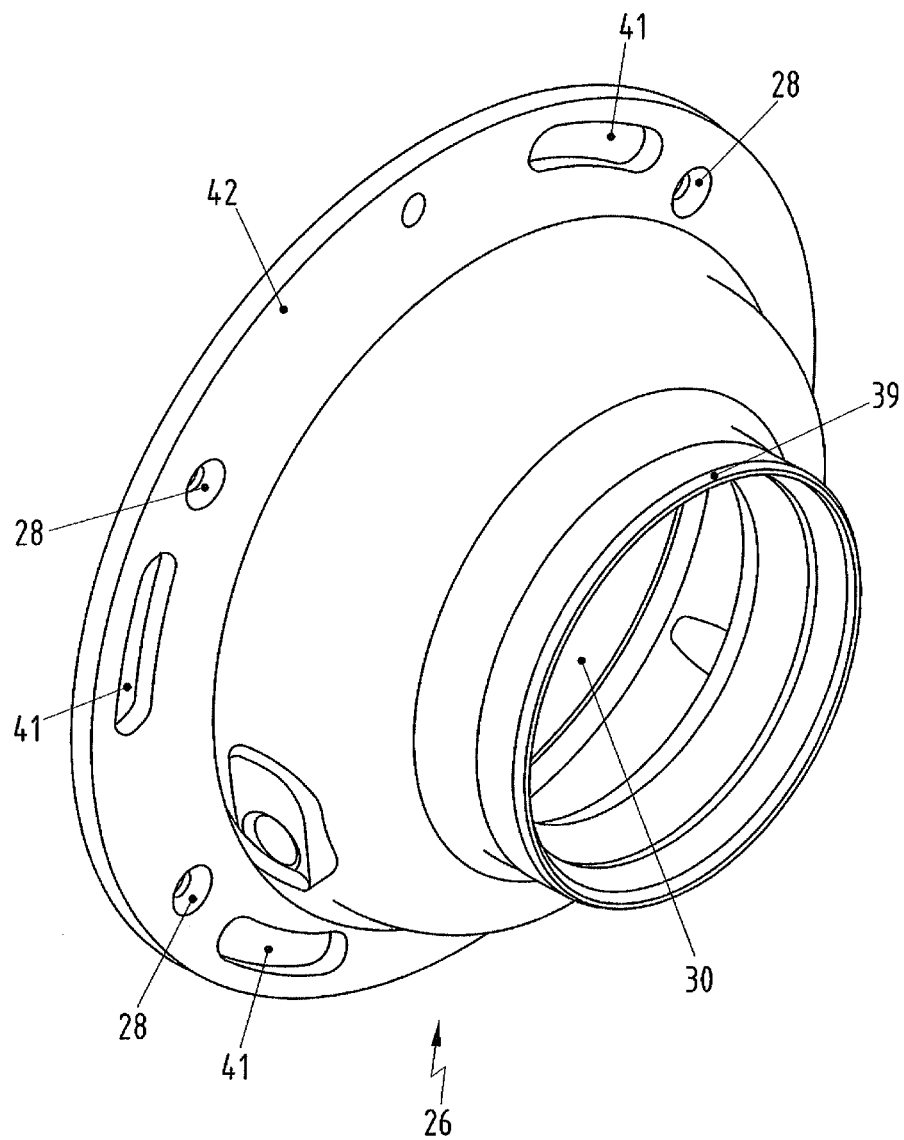
FIG. 7 shows a three-dimensional view of a pot forming a component part of the transmission housing.
Figure 8:
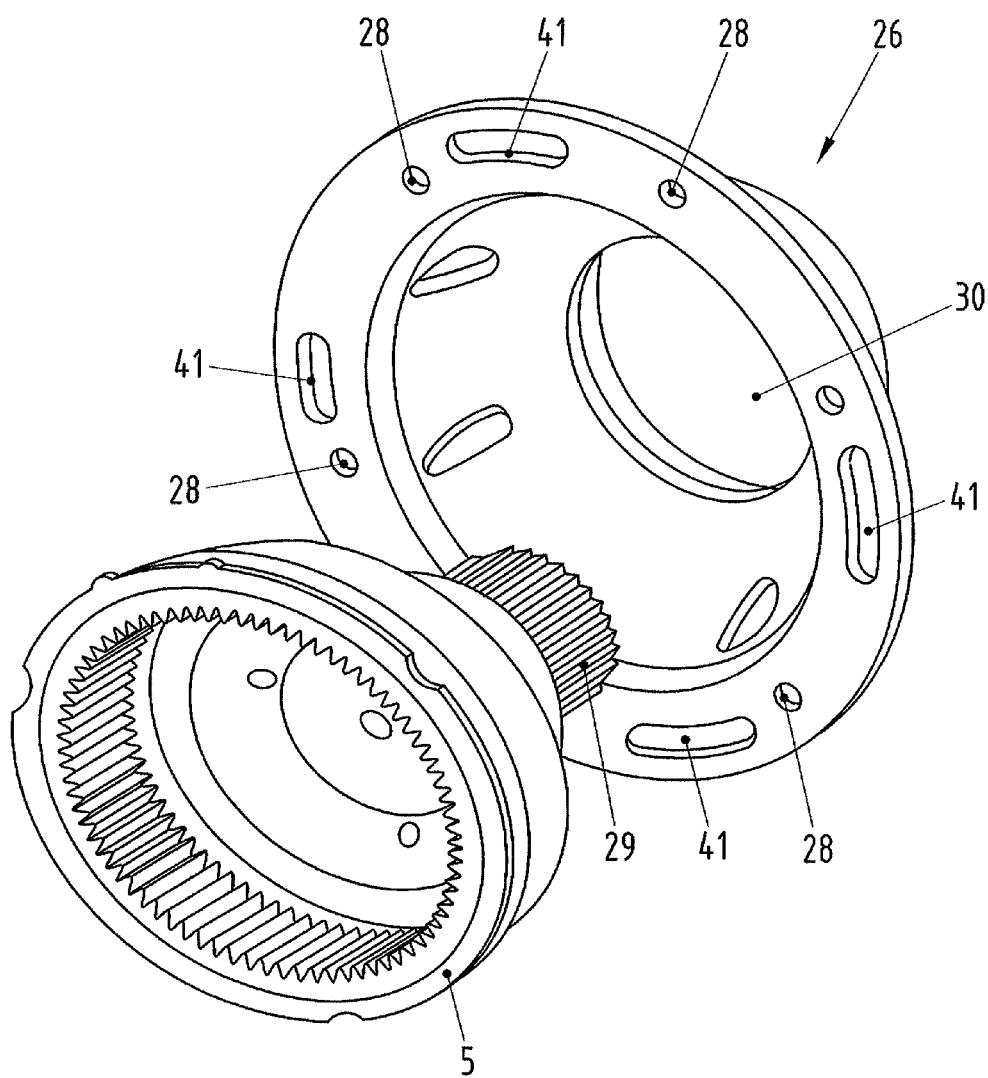
FIG. 8 shows a three-dimensional view of the pot according to FIG. 7 and of the internal wheel of the planetary transmission in an exploded illustration.

From the illustration in FIG. 8, in particular, it can be seen that the internal wheel 5 and an output shaft 29, which is designed as a multi-spline shaft, form a single component part. When the internal wheel 5 is in a mounted position relative to the pot 26, the output shaft 29 passes through an opening 30 in the pot 26. FIG. 6 illustrates that an output flange 31 is mounted for conjoint rotation and in an axially fixed manner in the output shaft 29, outside the cartridge 1. The rear wheel of the motorcycle is attached to this output flange 31.

Figure 9:
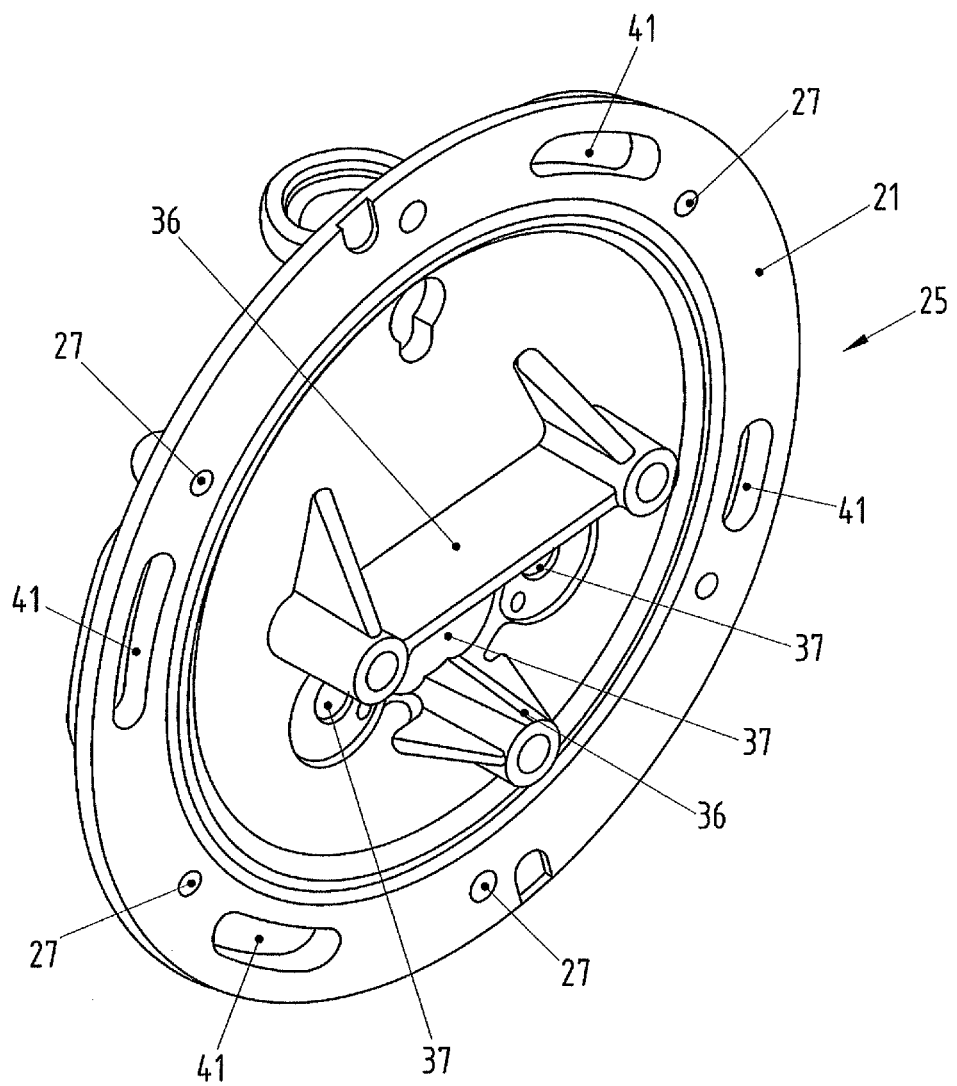
FIG. 9 shows a three-dimensional view of a cover forming a component part of the transmission housing.
Figure 10:
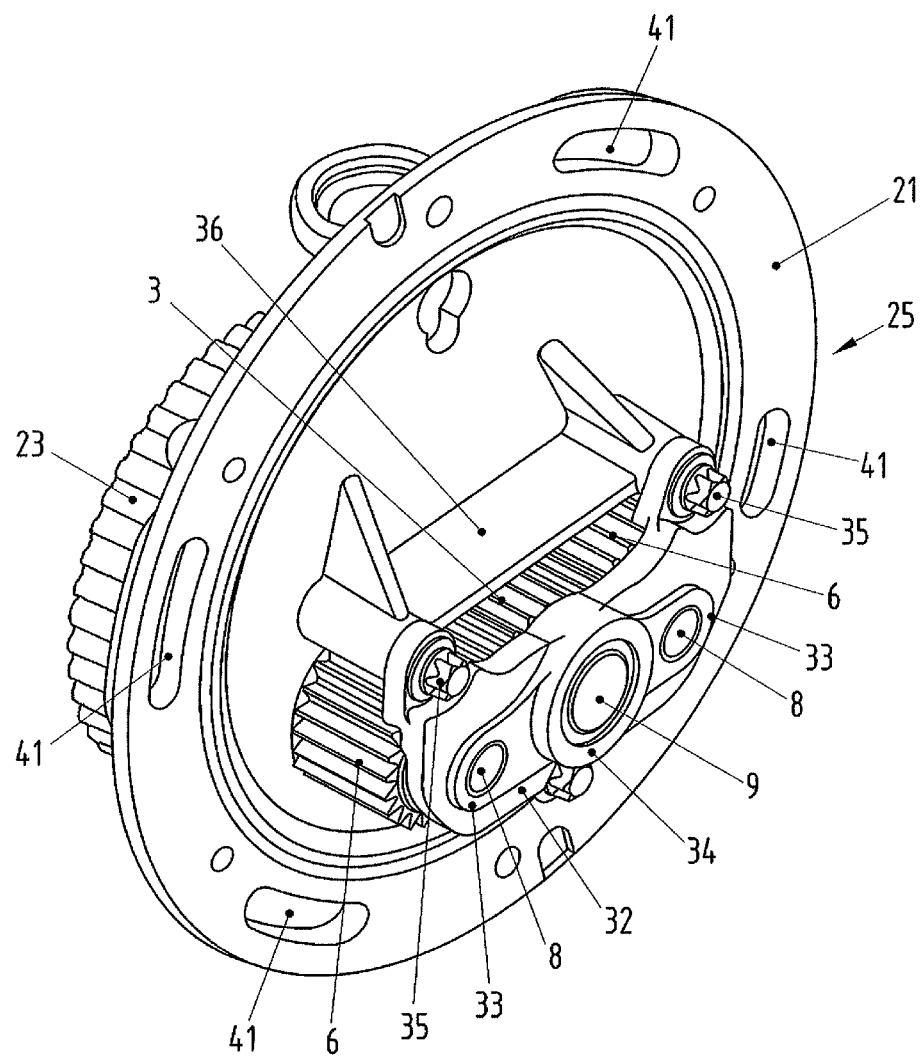
FIG. 10 shows a three-dimensional view of the cover shown in FIG. 9 together with a bearing bracket for the two planet wheels and the sun wheel and an input wheel connected to the sun wheel.
Figure 11:
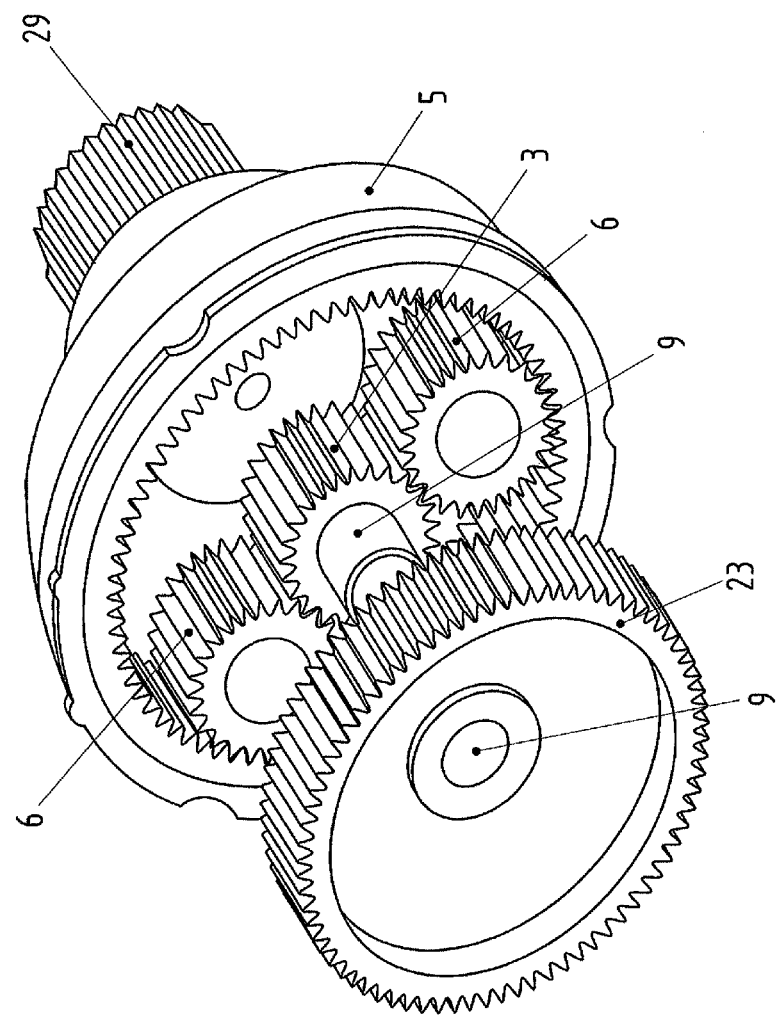
FIG. 11 shows a three-dimensional view of the intermeshing wheels of the planetary transmission, including the input wheel connected to the sun wheel and the output wheel connected to the internal wheel.

FIGS. 9 and 10 illustrate that the sun wheel 3 and the two planet wheels 6 are mounted in a common bearing component, which is designed as a bearing bracket 32. The bearing bracket 32 has two sockets 33 for the bearing shafts 8 of the planet wheels 6. Between the sockets 33, the bearing bracket 32 furthermore has a socket 34 for the shaft 9 of the sun wheel 3. Screws 35 are used to secure the bearing bracket 32 to axially projecting supporting sections 36 of the cover 25. The cover 25 is provided with three openings for the passage of the shafts 8 and 9 of planet wheels 6 and sun wheel 3.

As can be seen from FIG. 12, mounting socket 15 of the swingarm 11 is provided with a circular opening 38 in the region of the bottom of the mounting socket. This serves to accommodate the rotationally symmetrical projection 39 of the pot 26 with slight radial play. Concentrically with the opening 38, mounting socket 15 is provided with inward-facing mounting surfaces 40, the pot 26 being positioned in mounting socket 15 with minimal radial play between the mounting surfaces 40. If the cartridge 1 is inserted into mounting socket 15 but not screwed to the swingarm 11, it can therefore be pivoted about the axis of the circular opening 38. Owing to the offset of the axes 2 and 4 of sun wheel 3 and internal wheel 5 it is possible, while rotating the cartridge 1, to move the axis 2 of the sun wheel 3 parallel to the swingarm 11, while the axis 4 of the internal wheel 5 remains invariable owing to the geometrical conditions. Rotating the cartridge 1 by a certain, small pivoting angle in mounting socket 15 has the effect that the toothed belt 24 wrapped around the pinion 19 and the input wheel 23 is more highly tensioned or relaxed, depending on the direction of rotation of the cartridge 1.

FIGS. 4, 10, 12 and 13 illustrate the means for fixing the cartridge 1 on the swingarm 11 in various positions of the cartridge 1 relative to the swingarm 11, and furthermore illustrate the means for pivoting and fixing the cartridge 1 relative to the swingarm 11.

FIG. 10 illustrates that the cover 25 and the pot 26 are provided with a plurality of slotted holes 41, specifically with four such holes, which are arranged in the region of an outer flange section 42 of the cover 25 and in an outer flange section 21 of the pot 26. When viewed on a circle, the slotted holes, which are curved in a circular arc, are arranged in a uniformly distributed manner. The circle on which the slotted holes 41 are arranged is arranged concentrically with a circle which passes through the mounting surfaces 40 of mounting socket 15. The screws 20 pass through the slotted holes 41 and are screwed into threaded holes 43 in the swingarm 11, in the region of mounting socket 15. The screws 20 thus serve to fix the cartridge 1 on the swingarm 11.

In the region of one screw 20, more specifically the screw arranged in the region between the top strand and the bottom strand of the toothed belt 4, an angled bridge element 44 is connected to the cover 25 of the cartridge 1. This bridge element 44 is fixed by means of two screws 45, which pass through holes in a leg section of the bridge element 44 and are screwed into threaded holes in the flange section 21 of the cover 25. In the region of a leg of the bridge element 44 remote from the above leg, the bridge element is arranged parallel to the front face of the input wheel 23 and, in the region of its end associated with the shaft 9, accommodates a rolling contact bearing 46 for supporting the outer, free end of the shaft 9. At a distance from the shaft 9, this section of the bridge element 44 has a square aperture 47 for insertion of a square end of a tool.

The toothed belt 24 can be tensioned by inserting the square end of the tool into the square opening 47 of the bridge element 44 with the cartridge 1 screwed loosely to the swingarm 11 by means of the screws 20, and turning the cartridge 1, which is supported on the mounting surfaces 40 of the swingarm 11, relative to mounting socket 15 of the swingarm 11 by slightly pivoting the tool and hence pivoting the bridge element 44. Because of the offset between the axes 2 and 4 of the planetary transmission 1, the toothed belt 24 is tensioned to a greater extent, given an appropriate direction of pivoting of the cartridge 1. Rotation of the cartridge 1 relative to the swingarm 11 is possible because the screws 20 pass through the slotted holes 41 in the cover 25 and the pot 26. In the desired tensioning position of the cartridge 1, the bridge plate 44 is held by means of the tool, and the screws 20 are then tightened firmly.

As an alternative, the rotational position of the cartridge 1 relative to the swingarm 11 can be pre-adjusted through rough adjustment by means of the tool with the screws 20 relatively loose, and fine adjustment can be accomplished by means of a tensioning screw 48, which is mounted rotatably in a socket 49 having a corresponding thread, which is connected to the swingarm 11. This tensioning screw 48 can be unscrewed until it is supported against a stop 42 of the bridge element 44 and positions the bridge element 44 and consequently the cartridge 1 in the desired pivoted position relative to the swingarm 1, thus setting the desired pretension in the toothed belt 24. Only then are the screws 20 fully tightened.

If the electric machine 16 is used to drive the motorcycle, the electric machine thus has the function of an electric motor, and the motive power is transmitted via the electric motor and the pinion 19 interacting with the latter to the toothed belt 24, which interacts with the input wheel 23. This input wheel drives the sun wheel 3, which drives the internal wheel 5 via the two planet wheels 6. Via the output shaft 26 associated with the internal wheel 5 and via the output flange 31 interacting with said shaft, the rear wheel of the motorcycle, which is connected to the output flange 31, is driven. When the power is reversed, e.g. when the motorcycle is braked, a torque is introduced in the opposite direction and hence is introduced via the rear wheel of the motorcycle, in which case the electric machine 16 acts as an electric generator, allowing the battery of the motorcycle to be charged.

The drive unit permits a large reduction of the high maximum speed of the electric machine relative to the rotational speed of the rear wheel of the motorcycle. The reduction of the belt drive is, for example, 1:2, that of the planetary transmission 1:4, and therefore the overall reduction is 1:8. At a speed of the electric motor of 10 000 rpm, the rear wheel speed is therefore 1250 rpm.

The invention described is in no way limited to application on motorcycles. There is, for example, also the possibility of using the drive unit 10 in the context of power generation by means of a wind wheel. In this case, the support element 11 is not a swingarm but a stationary component, and a wind wheel interacts with the output shaft 26 of the planetary transmission 1, driving the electric machine, which is designed as an electric generator, via the planetary transmission.

LIST OF REFERENCE SIGNS

1 planetary transmission/cartridge
2 first axis
3 sun wheel
4 second axis
5 internal wheel
6 planet wheel
7 axis
8 bearing shaft
9 shaft
10 drive unit
11 support element/swingarm
12 mounting socket
13 mounting socket
14 mounting socket
15 mounting socket
16 electric machine
17 hole
18 output shaft
19 pinion
20 screw
21 flange section
22 housing
23 input wheel
24 toothed belt
25 first housing part/cover
26 second housing part/pot
27 threaded hole
28 hole
29 output shaft
30 opening
31 output flange
32 bearing bracket
33 socket
34 socket
35 screw
36 supporting section
37 opening 38 opening
39 projection
40 mounting surface
41 slotted hole
42 stop
43 threaded hole
44 bridge element
45 screw
46 rolling contact bearing
47 square opening
48 tensioning screw
49 socket
A arrow
B predetermined center-to-center distance

What is claimed:

1. A drive unit having a transmission, which has an input axis and an output axis, which are arranged parallel to one another and spaced apart, wherein the transmission is a cartridge which forms a unit and is connected to a support element forming a component part of the drive unit, wherein the cartridge is mounted in the support element in a manner which allows rotation relative to the support element, in order to shift a position of either the input axis or the output axis relative to the support element, wherein the transmission is connected in a torque-transmitting manner to an electric machine, which is designed as an electric motor and/or as an electric generator, wherein the support element is a swingarm, which, in a region of one end, has a socket to allow pivotable support in a frame of a motorcycle and, in a region of the other end of the swingarm, has a socket for the cartridge, and the electric machine is connected to the support element in the region of pivotable support, and a power transmission means is provided for transmitting torque between the electric machine and the transmission.

2. The drive unit as claimed in claim 1, wherein the transmission has two housing parts comprising a pot and a cover for closing the pot.

3. The drive unit as claimed in claim 2, wherein the two housing parts are connected to one another.

4. The drive unit as claimed in claim 2, wherein the two housing parts are screwed to one another.

5. The drive unit as claimed in claim 1, wherein the transmission is configured to be driven by the electric motor.

6. The drive unit as claimed in claim 1, wherein the transmission is configured to drive the electric generator.

7. The drive unit as claimed in claim 1, wherein the transmission is configured to drive a wheel of a vehicle.

8. The drive unit as claimed in claim 1, wherein the transmission is configured to drive a rear wheel of the motorcycle.

9. The drive unit as claimed in claim 1, wherein the electric generator is driven by the transmission that is driven by either a wheel of a vehicle or a wind wheel.

10. The drive unit as claimed in claim 9, wherein the wheel is a rear wheel of a motorcycle.

* * * * *